Aug. 22, 1967   L. H. COPE ET AL   3,336,656
MANUFACTURE OF CERMET BODIES
Filed March 20, 1963
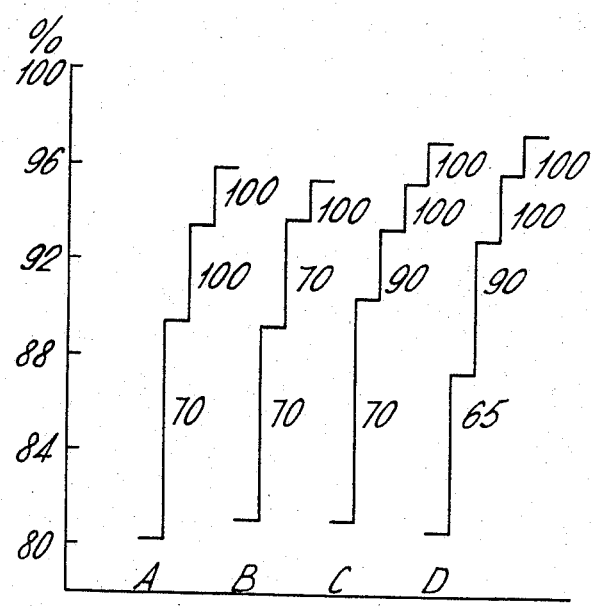

United States Patent Office 3,336,656
Patented Aug. 22, 1967

3,336,656
MANUFACTURE OF CERMET BODIES
Lawrence H. Cope and Richard J. Warmer, Thurso, Scotland, assignors to United Kingdom Atomic Energy Authority, London, England
Filed Mar. 20, 1963, Ser. No. 266,717
Claims priority, application Great Britain, Mar. 27, 1962, 11,763/62
6 Claims. (Cl. 29—473.3)

The present invention relates to the manufacture of cermet nuclear fuel bodies. In the present context, the term 'cermet' is to be understood to mean a substance of ceramic character which is dispersed in or bonded by a metallic matrix to form a self-coherent mass. A typical cermet nuclear fuel body with which the invention is particularly although not exclusively concerned has granules of uranium dioxide and/or plutonium dioxide dispersed in a matrix of stainless steel.

Advantages generally expected of cermet fuel for nuclear reactors are, briefly stated, the retention of fission product gases within the body of the fuel and improvement of the thermal conduction as compared with undiluted ceramic fissile compound. Both these advantages are only realised in full measure if the density achieved in the cermet is for practical purposes the same as the theoretical density, and the extent of advantage gained is reduced in proportion to the amount by which the actual density falls short of what is theoretically obtainable. Any voidage remaining in the cermet affects the thermal conductivity and, since it is found to be largely interconnected, permeability is introduced and allows fission product gases to find their way to the fuel periphery and build up pressure against cladding or sheathing in which the fuel is encased. The higher the pressure for which this cladding or sheathing must be designed the thicker its section and consequently the lower the overall heat transfer from the fuel to a coolant passed over the cladding or sheathing to abstract heat produced by fission of the fuel. Thus, in two ways, namely by reduced thermal conductivity in the fuel and by the requirement for thicker cladding or sheathing, insufficient density entails that for a given maximum operating temperature in the middle of the fuel the permissible size of fuel element section becomes relatively small and the number of individual fuel components or elements necessary for a critical core is correspondingly increased. Such increase detracts from the economy of power generation and therefore in cermet fuel high density is of considerable importance.

It is now proposed in accordance with the present invention that in manufacturing a cermet nuclear fuel body a sintered compact of the cermet is repeatedly coined with an annealing treatment between consecutive coining operations. During each coining operation, the squeezing of the compact in a closed die under cold conditions achieves densification to a degree depending upon the work-hardening capacity of the matrix metal. The effects of the work-hardening are removed by the subsequent annealing treatment and thereupon the compact is prepared for further densification by the next coining operation. The annealing treatment and coining operation are repeated until an asymptote is reached on density or until the performance of further cycles becomes economically unattractive. Preferably coining is carried out at least three times at pressures increasing in steps in the range 50 to 100 tone per sq. inch.

Cladding or sheathing which has to be bonded to the resulting densified cermet fuel body in the fabrication of a nuclear reactor fuel element may require an intermediate metal layer to establish the bond. It is therefore a feature of the invention that a cermet nuclear fuel body which has been densified by repeated cycles of coining and annealing is electroplated with metal for forming a bond with the sheathing for the body. The virtual elimination of permeability in the body by the densification procedure enables conventional electrolplating techniques to be employed without the risk of entrapping plating bath solution and salts. In particular, a coating of nickel can be applied to the cermet body in this way without difficulty. Such nickel coating may serve to form a diffusion bond with the sheathing or may serve as a strike or flash for a second coating of braze metal to be used for forming a brazed bond; the thickness of nickel coating is, of course, adjusted according to the type of bond to be formed.

The invention is primarily applicable where the metal both of the cermet and of the sheathing is ferrous, and in the following example of carrying the invention into effect the case is considered of fabricating a nuclear reactor fuel element of rod-like shape in which there is encased in a sheath of stainless steel of AISI Type 316L a series of cermet nuclear fuel pellets composed of uranium dioxide dispersed in stainless steel of the same type, the ceramic oxide phase being about 50% by volume of the cermet. The procedure of this example is also applicable where the ceramic fissile compound is a mixture of the dioxides of uranium and plutonium.

In the making of the cermet pellets, oxide granules of graded size and shape are blended in the proper proportion with a pre-alloyed powder form of the stainless steel, the granules being coated, if necessary, with an organic liquid binder to promote the adherence of a skin of steel powder on the individual granules. The blended mixture is then subject to cold pressing under a pressure of about 50 tons/sq. inch in a pelleting press where the effect is to produce a green pellet which is sufficiently self-cohering to be handled without fragmentation. Pressure of the order mentioned has been found by careful experiment to strike a balance between, on the one hand, a fragile product and, on the other, some crushing of the ceramic granules. At this stage a figure of about 80% of the theoretical density is reached. It is to be understood herein that the theoretical density of the cermet makes allowance for less than theoretical density in the ceramic granules so that, as applied to the cermet, the density expressed as a percentage of the theoretical is a measure of the extent to which the interstitial spaces between the granules are filled.

The sintering process which is now performed on the green pellet initiates self-bonding of the matrix; although it does not increase the density signifiicantly (the improvement being probably no more than 3% for the type of cermet concerned in this example), the temperature employed, namely about 1350° C., is more than adequate to remove the effects of work-hardening and to leave the matrix in a softened condition. The sintered pellet is therefore prepared for the cycles of coining and annealing in accordance with the present invention. As a further preliminary, however, the pellet may be freed of trapped gas by heating in vacuum.

Since negligible dimensional change occurs during sintering, the first coining operation may be performed in the same die as was used for the cold pressing to form the green pellet. At this stage the cermet matrix is dense enough to cushion the ceramic granules so that a coining pressure of the order of 100 tons per sq. inch can be employed without fragmenting the granules, although it is preferred to take the more cautious approach of increasing in steps to such a figure from, say, a starting pressure of 65 tons per sq. inch. In the case of the stainless steel of the present example, a temperature of about 1050° C. for the subsequent annealing treatment suffices for removing the work-hardening effects.

Three or four similar coining operations, each one after the first being preceded by the same annealing treatment, should prove enough to increase the cermet density to about 97% of the theoretical density. The density increase is achieved in diminishing steps and since some "spring-back" on the pellet is possible during the annealing treatments of the later steps provision may have to be made for increasing sizes of die.

Results achieved with differing numbers of coining operations and a variety pressure increase steps are shown graphically in the accompanying drawing for a batch of specimens A to D. The figures denote the coining pressure employed in tons per sq. inch and the vertical scale is the percentage of theoretical density attained.

Pellets densified in the above manner and electroplated with bond metal are inserted in the stainless steel sheath which accepts them with a close fit. Compression of the sheath onto the pellets to sandwich the bond metal may be accomplished by a simple operation such as light cold-drawing. The bond is established by an appropriate heat treatment which may be adjusted to a sufficiently high temperature to serve also for the purpose of stress-relieving and final annealing. The slight expansion resulting in the pellets from the final annealing assists in ensuring intimate contact with the sheath. It is worthy of note that the densification of the cermet and the bonding to the sheath are entirely separate operations so that in each case conditions are controlled with only the single objective in view, this being particularly desirable for the bond formation.

A further advantage of the invention is that the cycles of coining and annealing afford ample opportunity for achieving the preferred grain size in the matrix metal by correlation of the coining pressure, and hence the degree of work-hardening, with the annealing temperature. Close dimensional accuracy is obtainable with coining so that the pellet shape can be worked readily to optimum designs.

Although maximum densification is the more usual objective, the invention is also applicable for the more general objective of achieving a controlled degree of densification; thus circumstances may arise which call for a controlled percentage of isolated voids, for example for the accumulation of gaseous fission products. In such a case, a matrix of high thermal conductivity is of more importance than one which is strong at elevated temperatures so that copper or nickel might well be more appropriate than stainless steel. With copper, which does not work-harden so rapidly as stainless stel, the desirable density is achievable with less pressure and fewer coining and annealing cycles.

What we claim is:

1. In the manufacture of a cermet nuclear fuel body, the steps of blending granules of a ceramic fissile compound with powdered metal, cold pressing the blend to produce a green compact, sintering the compact in an atmosphere which is inert towards the fissile compound and the metal, and coining the compact repeatedly at least three times at successively increasing pressures, the compact being annealed between consecutive coining operations.

2. In the manufacture of a nuclear reactor fuel element containing a cermet nuclear fuel body, the steps of subjecting a sintered compact of the ceramic and metallic components of the cermet to repeated coining operations, the first coining operation being at a pressure less than for the succeeding coining operations, annealing the compact between consecutive coining operations, inserting the coined compact into a closely fitting sheath, and subjecting the assembled sheath and compact to a treatment involving heating to an annealing temperature whereby slight expansion resulting in the compact from the annealing thereof assists in ensuring intimate contact with the sheath.

3. In the manufacture of a nuclear reactor fuel element containing a cermet nuclear fuel body, the steps of subjecting a sintered compact of the ceramic and metallic components of the cermet to repeated coining operations, each coining operation being at a pressure less than for each succeeding operation, annealing the compact between consecutive coining operations, electroplating the compact with a bond metal, inserting the plated compact into a closely fitting sheath, compresing the sheath on to the compact, and subjecting the assembly of sheath and compact to a heat treatment to establish a bond by means of the bond metal.

4. In the manufacture of a nuclear reactor fuel element containing a cermet nuclear fuel body of a ceramic fissile compound dispersed as granules in a matrix of steel, the steps of blending the granules with steel in powder form, cold pressing the blend to produce a green compact sintering the compact in an atmosphere which is inert towards the fissile compound in the metal, coining the compact repeatedly at least three times at successively increasing pressures in the range 50 to 100 tons per sq. inch, annealing the compact between consecutive coining operations at a temperature of about 1050° C., electroplating the compact with a bond metal, inserting the compact into a closely fitting sheath, compressing the sheath onto the compact, and subjecting the assembly of sheath and compact to a heat treatment to establish a bond by means of the bond metal, the temperature achieved in said treatment being sufficient for slight expansion resulting in the compact from annealing thereof to assist in ensuring intimate contact with the sheath.

5. In the manufacture of a cermet nuclear fuel body the steps of subjecting a sintered compact of the ceramic and metallic components of the cermet to repeated coining operations, each of said coining operations being at a pressure less than for each succeeding coining operation and the compact being annealed between consecutive coining operations.

6. The steps according to claim 5 wherein the compact is coined at least three times and the pressures employed for each coining operation are increased stepwise within the range 50 to 100 tons per sq. inch.

References Cited
UNITED STATES PATENTS

| | | | |
|---|---|---|---|
| 2,820,751 | 1/1958 | Saller | 204—154.2 |
| 2,991,601 | 7/1961 | Glatter et al. | 204—154.2 |
| 3,004,906 | 10/1961 | Binstock | 204—154.2 |
| 3,015,615 | 1/1962 | Precht et al. | 204—154.2 |

FOREIGN PATENTS 862,464  3/1961  Great Britain.

OTHER REFERENCES

Nuclear Metallurgy, vol. V, Oct. 29, 1958, pp. 29–40, copy in Library, TN 607 N8.

Treatise on Powder Metallurgy, by Goetzel, vol. 1, pp. 3, 4 and 656, 1949, copy in Library, TN 695 G6.

JOHN F. CAMPBELL, *Primary Examiner.*

R. W. MacDONALD, P. M. COHEN,
*Assistant Examiners.*